United States Patent
Isono et al.

(10) Patent No.: US 10,850,714 B2
(45) Date of Patent: Dec. 1, 2020

(54) BRAKE OPERATING DEVICE

(71) Applicants: TOYOTA JIDOSHA KABUSHIKI KAISHA, Toyota (JP); AISIN SEIKI CO., LTD., Kariya (JP)

(72) Inventors: Hiroshi Isono, Toyota (JP); Chiaki Sumi, Kariya (JP); Naoya Iesato, Kariya (JP); Yasukuni Ojima, Kariya (JP)

(73) Assignees: TOYOTA JIDOSHA KABUSHIKI KAISHA, Toyota (JP); AISIN SEIKI CO., LTD., Kariya (JP)

(*) Notice: Subject to any disclaimer, the term of this patent is extended or adjusted under 35 U.S.C. 154(b) by 0 days.

(21) Appl. No.: 16/614,964

(22) PCT Filed: Mar. 23, 2018

(86) PCT No.: PCT/JP2018/011592
§ 371 (c)(1),
(2) Date: Nov. 19, 2019

(87) PCT Pub. No.: WO2018/216337
PCT Pub. Date: Nov. 29, 2018

(65) Prior Publication Data
US 2020/0172059 A1 Jun. 4, 2020

(30) Foreign Application Priority Data
May 25, 2017 (JP) .................................. 2017-103326

(51) Int. Cl.
*B60T 7/04* (2006.01)
*B60T 8/32* (2006.01)
*B60T 11/20* (2006.01)

(52) U.S. Cl.
CPC .............. *B60T 7/042* (2013.01); *B60T 8/326* (2013.01); *B60T 11/20* (2013.01); *B60T 2270/82* (2013.01)

(58) Field of Classification Search
CPC ..... G01L 5/22; G01L 1/00; G01L 1/26; B60T 7/042; B60T 2270/82; B60T 8/326; B60T 11/20; B60T 8/171
See application file for complete search history.

(56) References Cited

U.S. PATENT DOCUMENTS 4,730,877 A * 3/1988 Seibert .................... B60T 7/042
188/358
9,004,617 B2 * 4/2015 Ishida ................... B60T 13/662
303/122.04

(Continued)

FOREIGN PATENT DOCUMENTS

JP     2011-152920 A     8/2011
JP       5378352 B2     12/2013

*Primary Examiner* — Abiy Teka
(74) *Attorney, Agent, or Firm* — Sughrue Mion, PLLC (57) ABSTRACT

A brake operating device in which an operation of a brake pedal can be detected easily by a simple structure is provided. The brake operating device 1 comprises: a pusher 19, 20 connected to a brake pedal 2; a hydraulic system 5 in which fluid is held between the pusher 19, 20 and a pushing element 27 to transmit a thrust force of the pusher 19, 20 to the pushing element 27; a first elastic mechanism 23*a*, 23*b* that establishes an elastic force to isolate the pusher 19, 20 away from the pushing element 27; a cylinder 18 holding the pusher 19, 20 while restricting a withdrawal limit of the pusher 19, 20 in a direction away from the pushing element 27; and a second elastic mechanism 37 that is arranged at a position to push the cylinder 18, and that establishes an elastic force against the elastic force in the direction to isolate the pusher 19, 20 away from the pushing element 27.

12 Claims, 2 Drawing Sheets

(56) References Cited

U.S. PATENT DOCUMENTS

2010/0181825 A1* 7/2010 Drumm ................. B60T 8/4077
                                                    303/122.13
2016/0229383 A1* 8/2016 Leiber ................... B60T 13/745
2018/0017451 A1   1/2018 Iesato et al.

* cited by examiner

BRAKE OPERATING DEVICE

CROSS REFERENCE TO RELATED APPLICATIONS

This application is a National Stage of International Application No. PCT/JP2018/011592 filed Mar. 23, 2018, claiming priority based on Japanese Patent Application No. 2017-103326, filed May 25, 2017.

TECHNICAL FIELD

The present invention relates to a brake device that generates a braking force by depressing a brake pedal by a driver, and more specifically, to a device for detecting an operation of the brake device or an operating force applied to the brake device.

BACKGROUND ART

Patent Document 1 describes a braking force control device controlling a braking force by a brake-by-wire system. The device taught by Patent Document 1 comprises a master cylinder that establishes a master cylinder pressure in response to a depression of a brake pedal, a wheel cylinder that is connected to the master cylinder, an actuator that generates a braking force by the brake-by-wire system, and a controller that transmits a control signal to the actuator. To the controller, detection signals are transmitted from a stroke sensor that detects an operation amount of the brake pedal, a pressure sensor that detects the master cylinder pressure, and other various sensors. The controller calculates a target deceleration based on the detection signals transmitted from the sensors, and controls the actuator in such a manner as to achieve the target deceleration.

Patent Document 2 also describes a brake system for controlling a braking force by a brake-by-wire system. The brake system taught by Patent Document 2 comprises a tandem master cylinder having an elastic element and a piston actuated in accordance with a stroke of a brake pedal. The braking force is controlled based on a movement of the piston detected by a travel sensor, and a master cylinder pressure detected by a pressure sensor.

PRIOR ART DOCUMENT

Patent Literature

Patent Document 1: JP 2011-152920 A.
Patent Document 2: JP 5378352 B2.

SUMMARY OF INVENTION

Technical Problem to be Solved by the Invention

The braking force control device described in Patent Document 1 and the brake system described in Patent Document 2 are configured to control the braking force based on the sensor value. Therefore, a desirable braking action may be achieved. However, a change in a hydraulic pressure by the master cylinder is delayed inevitably. That is, a pedal force may not be detected accurately during the lag time from a point at which the brake pedal is depressed to a point at which the hydraulic pressure starts changing. In addition, in order to improve a brake feeling (or operation feeling), the brake pedal is provided with an elastic member which establish a reaction force against the pedal force. That is, the piston will not be moved until the pedal force applied to the brake pedal overwhelms the reaction force established by the elastic member. Therefore, the pedal force cannot be detected until the piston is moved, and this may cause a control delay. If a pedal force sensor is arranged to detect the pedal force applied to the brake pedal during such period in which a stroke of the brake period cannot be detected, a manufacturing cost will be increased.

The present invention has been conceived noting the foregoing technical problems, and it is therefore an object of the present invention to provide a brake operating device in which an operation of a brake pedal can be detected easily by a simple structure.

Means for Solving the Problem

According to one aspect of the present invention, there is provided a brake operating device having a detecting mechanism that transmits a signal in accordance with a pushing force, and a pushing element that pushes the detecting mechanism by a pushing force in accordance with a pedal force applied to a brake pedal. In order to achieve the above-explained objective, according to the embodiment of the present invention, the brake operating device is characterized by comprising: a pusher that is connected to the brake pedal; a hydraulic system in which fluid is held between the pusher and the pushing element to transmit a thrust force of the pusher to the pushing element; a first elastic mechanism that establishes an elastic force in a direction to isolate the pusher away from the pushing element; a cylinder that holds the pusher while restricting a withdrawal limit of the pusher in a direction away from the pushing element; and a second elastic mechanism that is arranged at a position to push the cylinder, and that establishes an elastic force against the elastic force in the direction to isolate the pusher away from the pushing element.

According to the present invention, the pusher may comprise a piston that pushes the first elastic mechanism in a direction against the elastic force of the first elastic mechanism in accordance with the pedal force applied to the brake pedal.

According to the present invention, the piston may comprise a first piston that is connected to the brake pedal, and a second piston that is arranged between the first piston and the pushing element while being allowed to move relatively to the first piston. The first elastic mechanism may comprise a first elastic member that establishes an elastic force to isolate the first piston and the second piston away from each other, and a second elastic member that establishes an elastic force to isolate the second piston from the pushing element.

According to the present invention, a spring constant of the second elastic member may be smaller than a spring constant of the first elastic member.

According to the present invention, the brake operating device may further comprise a deforming body that is deformed by the pushing force of the pushing element. The detecting mechanism may comprise a strain gauge that detects a deformation of the deforming body.

According to the present invention, the pushing element may be adapted to be moved by a pushing force generated by the first elastic mechanism and the hydraulic system to push the deforming body. The brake operating device may further comprise a load restricting mechanism that restricts a load applied to the deforming body by restricting a travel distance of the pushing element toward the deforming body.

Advantageous Effects of Invention

The brake operating device according to the present invention comprises the detecting mechanism that transmits a signal in accordance with a pushing force, and the pushing element that pushes the detecting mechanism by the pushing force in accordance with a pedal force applied to the brake pedal. The brake operating device further comprises: the hydraulic system in which fluid is held between the pusher and the pushing element to transmit a thrust force of the pusher to the pushing element; the first elastic mechanism that establishes an elastic force in a direction to isolate the pusher away from the pushing element; and the second elastic mechanism that establishes an elastic force against the elastic force (in the direction to isolate the pusher away from the pushing element). Therefore, when the pedal force is applied to the brake pedal, the first elastic mechanism is subjected to a force to be compressed. In this situation, the spring forces of the first elastic mechanism before compressed is applied to the pushing element in addition to the second elastic mechanism, even if the pedal force is still small and the pusher has not yet been moved forward. Then, when the brake pedal is further depressed so that the pusher is moved forward, the first elastic mechanism is compressed so that the pushing element is pushed toward the detecting mechanism by the spring force of the first elastic mechanism and the hydraulic pressure established by the hydraulic system. In the brake operating device according to the present invention, therefore, the pedal force applied to the brake pedal can be measured in an initial phase of depression of the brake pedal even before the hydraulic pressure is established. For this reason, an operation of the brake pedal can be detected accurately.

In addition, according to the present invention, the brake operating device further comprises the load restricting mechanism that restricts the load applied to the deforming body by restricting a travel distance of the pushing element toward the deforming body. Therefore, a maximum load applied to the deforming body and the strain gauge of the detecting mechanism can be restricted, and a detection range of the strain gauge can be set to a desired range. For these reasons, the load applied to the detecting mechanism can be measured accurately.

DESCRIPTION OF EMBODIMENT(S)

Figure 1:
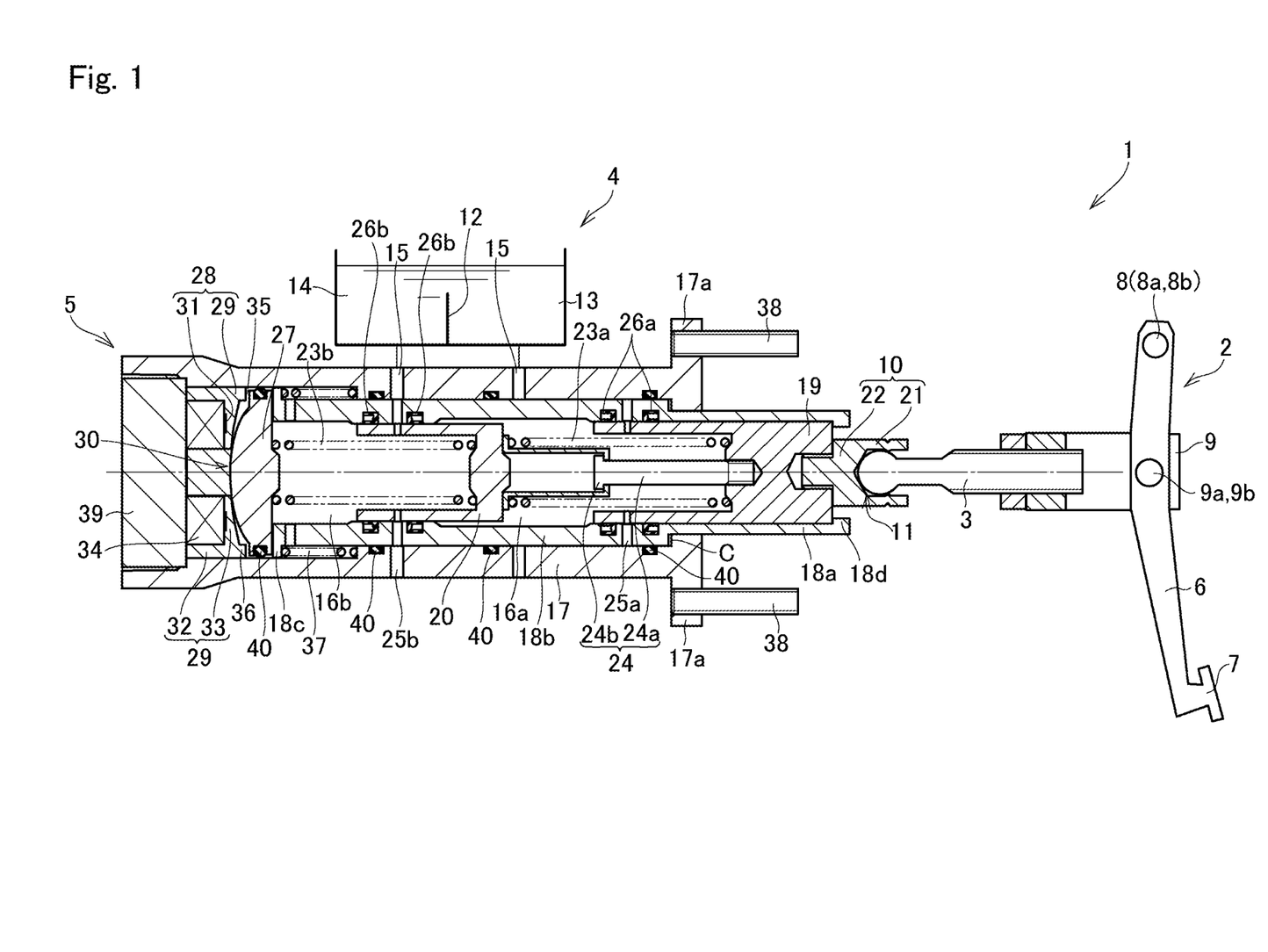
FIG. 1 is a view showing one example of a structure of the brake operating device according to the present invention.

Here will be explained an embodiment of the present invention. FIG. 1 shows one example of a brake operating device 1 to which a present invention is applied. The brake operating device 1 establishes a braking force applied to a vehicle in accordance with a stroke of a brake pedal 2 and a pedal force applied to the brake pedal 2. The brake operating device 1 shown in FIG. 1 comprises the brake pedal 2, an operation rod 3, a reservoir 4, and a master cylinder 5.

As illustrated in FIG. 1, the brake pedal 2 comprises a pedal arm 6 and a pedal pad 7. One end (an upper end) of the pedal arm 6 is installed on a not shown vehicle body in a pivotal manner. The pedal pad 7 is attached to the other end (a lower end) of the pedal arm 6.

The brake pedal 2 further comprises a pivot point 8 formed on the upper end portion of the pedal arm 6 at which the pedal arm 6 is connected to the vehicle body in a pivotal manner, and an output member 9. The pivot point 8 includes a hole formed e.g., on the pedal arm 6, and a pin inserted into the hole to attach the pedal arm 6 to the vehicle body in a pivotal manner. Alternatively, the pin may also be formed the pedal arm 6 and inserted into a hole formed of the vehicle body. According to the example shown in FIG. 1, The pivot point 8 is formed of a hole 8a formed on the pedal arm 6, and a pin 8b inserted into the hole 8a in a rotatable manner to attach the pedal arm 6 to the vehicle body.

The pedal arm 6 is connected to the operation rod 3 through the output member 9 so that a pedal force applied to the pedal pad 7 is transmitted to the operation rod 3. In the example shown in FIG. 1, a hole 9a is formed on an intermediate portion of the pedal arm 6, and a pin 9b of the output member 9 is inserted into the hole 9a in a rotatable manner to connect the pedal arm 6 to the output member 9.

The operation rod 3 is a transmission member that transmits force between the brake pedal 2 and an after-mentioned input piston 10. The operation rod 3, the brake pedal 2, and the master cylinder 5 are arranged coaxially to one another. As described, one end of the operation rod 3 is coupled to the pedal arm 6 through the output member 9 and the other end of the operation rod 3 is coupled to the input piston 10, so that the pedal force applied to the brake pedal 2 is transmitted to the master cylinder 5 through the operation rod 3. Specifically, the operation rod 3 is coupled to a joint portion 11 of the input piston 10 while being allowed to slide therein so that the operation rod 3 and the input piston 10 are reciprocated by a motion of the brake pedal 2.

The reservoir 4 is a tank holding brake fluid as a working fluid, and arranged above the master cylinder 5. An internal space of the reservoir 4 is divided into a first reservoir chamber 13 and a second reservoir chamber 14 by a partition wall 12, and a port (oil path) 15 opening toward the master cylinder 5 is formed on a bottom of each of the first reservoir chamber 13 and a second reservoir chamber 14. The brake fluid is supplied to a first pressure chamber 16a of the master cylinder 5 from the first reservoir chamber 13 through the port 15, and to a second pressure chamber 16b of the master cylinder 5 from the first reservoir chamber 13 through the port 15.

The master cylinder 5 is a fluid-pressure device that generates a hydraulic braking pressure (master cylinder pressure) in accordance with a pedal force applied to the brake pedal 2 or a thrust force of a pushing member connected to the brake pedal 2. According to the example shown in FIG. 1, a tandem master cylinder having two hydraulic pistons is adopted as the master cylinder 5, and the master cylinder 5 comprises two hydraulic systems. Therefore, even if one of the hydraulic systems is in trouble due to oil leakage or the like, the braking force can still be generated by the other hydraulic system. Hereinafter, the master cylinder 5 will be explained in more detail.

A stepped cylinder 18 is arranged in an inner circumferential side of a cylindrical housing 17. The input piston 10, a primary piston 19, and a secondary piston 20 are slidably held in the cylinder 18 while being allowed to reciprocate relatively to one another. The cylinder 18 comprises, from the brake pedal 2 side, a diametrically small section 18a, a diametrically large section 18b, and a flange section 18c. An inner diameter of an end portion 18d of the brake pedal 2 side is slightly smaller than an inner diameter of the diametrically small section 18a. According to the embodiment of the present invention, the end portion 18d restricts a withdrawal limit of the primary piston 19 and the secondary piston 20 from a below-mentioned pushing element 27.

The input piston 10 is arranged on an opposite side to the brake pedal 2 across the operation rod 3, and the input piston 10 comprises a cylindrical section 21 joined to the operation rod 3, and a column section 22 joined to the primary piston 19.

The primary piston 19 is arranged coaxially with the input piston 10 so that one end of the primary piston 19 is joined to the input piston 10. An elastic member is arranged in an inner circumferential side of the primary piston 19 so that the primary piston 19 is reciprocated together with the input piston 10 in response to a pivotal motion of the brake pedal 2. The elastic member is elastically compressed by depressing the brake pedal 2 thereby establishing a reaction force to return the brake pedal 2 to an initial position. According to the embodiment of the present invention, a return spring 23a is adopted as the elastic member. In the example shown in FIG. 1, the return spring 23a is designed to exert a set load in a direction to isolate the primary piston 19 elastically away from the secondary piston 20. In the embodiment of the present invention, the primary piston 19 serves as a "first piston", the secondary piston 20 serves as a "second piston", and the primary piston 19 and the secondary piston 20 serve as a "pusher".

As illustrated in FIG. 1, the first pressure chamber 16a is formed in a leading end (front) section of the primary piston 19 between the return spring 23a and the cylinder 18 in a radial direction. The first pressure chamber 16a is filled with the brake fluid supplied from the reservoir 4, and when the brake pedal is depressed, the primary piston 19 is pushed to establish a braking pressure. That is, the primary piston 19 is allowed to reciprocate within the first pressure chamber 16a.

A rod 24 as a hanging rod is inserted into the return spring 23a to position the return spring 23a while establishing the predetermined set load. The rod 24 comprises a shaft 24a and a head 24b. The primary piston 19, the return spring 23a, the first pressure chamber 16a, and the rod 24 serve as one of the two hydraulic systems.

The secondary piston 20 is arranged in the cylinder 18 at a substantially intermediate section in the axial direction between the primary piston 19 and the pushing element 27. The secondary piston 20 is also arranged coaxially with the input piston 10 and the primary piston 19 so that the secondary piston 20 is reciprocated together with the input piston 10 in response to the pivotal motion of the brake pedal 2. As described, the withdrawal limit of the primary piston 19 and the secondary piston 20 from the pushing element 27 is restricted by the end portion 18d of the cylinder 18.

A return spring 23b is arranged in an inner circumferential side of the secondary piston 20, and the second pressure chamber 16b is formed in a leading end (front) section of the secondary piston 20 between the return spring 23b and the cylinder 18 in the radial direction. As the aforementioned return spring 23a, the return spring 23b is elastically compressed by depressing the brake pedal 2 thereby establishing a reaction force to return the brake pedal 2 to the initial position. In the example shown in FIG. 1, the return spring 23b is designed to exert a set load in a direction to isolate the secondary piston 20 elastically away from the pushing element 27. Here, the set load of the return spring 23b is set lower than the set load of the return spring 23a arranged in the inner circumferential side of the primary piston 19.

Piston seals 26a are arranged on both sides of a port 25a formed in the primary piston 19, and piston seals 26b are arranged on both sides of a port 25b formed in the secondary piston 20. When the brake pedal 2 is depressed so that the pistons 19, 20 are pushed forward, the port 25a of the primary piston 19 passes over the piston seal 26a and the port 25b of the secondary piston 20 passes over the piston seal 26b simultaneously. That is, when the brake pedal 2 is not depressed, the reservoir 4 is connected to each of the ports 25a and 25b. Since the piston seals 26a are arranged on both sides of the port 25a and the piston seals 26b are arranged on both sides of the port 25b, a pressure in each of the pressure chambers 16a and 16b will not be raised until the port 25a and the port 25b pass over the piston seal 26a and the piston seal 26b respectively. If the port 25a of the primary piston 19 passes over the piston seal 26a and the port 25b of the secondary piston 20 passes over the piston seal 26b at different timings, the hydraulic pressures in the pressure chambers 16a and 16b will not be changed and the pedal force applied to the brake pedal 2 cannot be detected until the port 25a and the port 25b pass over the piston seal 26a and the piston seal 26b. Therefore, it is preferable to move the primary piston 19 and the secondary piston 20 simultaneously. For this purpose, in order to compress the return spring 23b of the secondary piston 20 earlier, the set load of the return spring 23b is set lower.

Specifically, a spring constant of the return spring 23b arranged in the inner circumferential side of the secondary piston 20 is set smaller than a spring constant of the return spring 23a arranged in the inner circumferential side of the primary piston 19. In other words, a spring force of the return spring 23b is weaker than a spring force of the return spring 23a. In the embodiment of the present invention, the return spring 23a and the return spring 23b serve as a "first elastic mechanism", the return spring 23a serves as a "first elastic member", and the return spring 23b serves as a "second elastic member".

As the first pressure chamber 16a, the second pressure chamber 16b is filled with the brake fluid, and when the brake pedal is depressed, the secondary piston 20 is pushed to establish a braking pressure. That is, the secondary piston 20 is allowed to reciprocate within the second pressure chamber 16b. The secondary piston 20, the return spring 23b, and the second pressure chamber 16b serve as the other one of the two hydraulic systems.

In the housing 17, the pushing element 27 that is shaped into a hemispherical shape is arranged in (a bottom of) the cylinder 18 on the opposite side to the brake pedal 2. The pushing element 27 serves as a "pushing member" that pushes a deforming body 29 of a load detecting mechanism 28 in accordance with a pedal force applied to the brake pedal 2. Specifically, the pushing element 27 is moved toward the deforming body 29 to push the deforming body 29 by a pushing force derived from hydraulic pressures in the pressure chambers 16a and 16b established by the pistons 10, 19, and 20, and elastic forces of the return springs 23a and 23b. In addition, the pushing element 27 serves not only as the above-mentioned pushing member but also as a pressure receiving member that receives the pedal force applied to the brake pedal 2. Specifically, the return spring 23b and the flange section 18c of the cylinder 18 are brought into contact to the pushing element 27, and the pushing element 27 comprises a pressure receiving face 30 that receives the pushing force derived from the hydraulic pressures in the pressure chambers 16a and 16b established by the pistons 10, 19, and 20, and the elastic forces of the return springs 23a and 23b. In other words, the pressure receiving face 30 receives the pedal force applied to the brake pedal 2.

The load detecting mechanism 28 that detects a load applied to the pushing element 27 is arranged in an opposite side to the cylinder 18 in the axial direction across the pushing element 27. Specifically, the load detecting mechanism 28 is a load sensor comprising the deforming body 29 and a strain gauge 31 that detects the pedal force applied to the brake pedal 2. The deforming body 29 is arranged in an opposite side to the return spring 23a in the axial direction across the pushing element 27, and comprises a cylindrical portion 32 and a tapered projection 33 protruding toward an inner circumferential side from the cylindrical portion 32. The projection 33 is brought into contact to an arcuate bottom face of the pushing element 27. The deforming body 29 is deformed by an external force applied thereto, and the strain gauge 31 is brought into contact to the deforming body 29 at a portion to be deformed.

Specifically, in the example shown in FIG. 1, the strain gauge 31 is interposed between a bottom face of the deforming body 29 and a supporting member 34. As the conventional one, the strain gauge 31 is a sensor in which resistance wires are arranged in a reticular pattern on a base or an etched resistance film is formed on the base while being connected to a lead wire, and is bonded to the deforming body 29 by an adhesive agent. Since the strain gauge 31 is very small, light and durable, the strain gauge 31 is suitable to measure deformation sensitively. According to the embodiment of the present invention, in order to measure the pedal force accurately, the deforming body 29 is formed in such a manner that the deforming body 29 can be deformed even by a relatively small load. As described, the strain gauge 31 is provided with the lead wire, and a circuit is formed in the supporting member 34. In the brake operating device 1 according to the embodiment of the present invention, a load of an input side such as a master cylinder pressure and the pedal force is not measured e.g., by a pedal force sensor arranged on the brake pedal 2, but a load in an output side where the load detecting mechanism 28 is arranged is measured.

An annular stopper portion 36 is formed on an outer circumference of the deforming body 29 in such a manner as to protrude toward the brake pedal 2 while maintaining a clearance 35 from the pushing element 27 when the brake pedal 2 is not depressed. The stopper portion 36 serves as a "load restricting mechanism" that restricts a load applied to the load detecting mechanism 28 when a predetermined load is applied to the pushing element 27. Specifically, if the load established by the input piston 10, the primary piston 19, and the secondary piston 20 when the brake pedal 2 is depressed exceeds a predetermined value, the pushing element 27 is moved toward the deforming body 29. Consequently, the aforementioned clearance 35 is packed so that a deformation of the deforming body 29 is restricted. Thus, a travelling distance of the pushing element 27 is restricted by the stopper portion 36 thereby restricting the load applied to the load detecting mechanism 28.

In order to improve an easiness of an assemble work, a predetermined clearance (endplay) C is maintained between the housing 17 and the cylinder 18 in the axial direction. According to the embodiment of the present invention, in order to maintain the clearance C, an elastic member 37 is arranged around the diametrically large section 18b of the cylinder 18 while being contacted to the flange section 18c. An elastic force of the elastic member 37 is greater than the set load of the return spring 23a, therefore, when the brake pedal 2 is positioned at the initial position, the clearance C is maintained in the axial direction. That is, the elastic force of the elastic member 37 is stronger than the reaction force against the brake pedal 2. Therefore, when the brake pedal 2 is not depressed, the pushing element 27 is isolated away from the primary piston 19 and the secondary piston 20. In other words, the elastic force of the elastic member 37 overwhelms the elastic forces of the return springs 23a and 23b acting in the direction to isolate the primary piston 19 and the secondary piston 20 away from the pushing element 27. Accordingly, the elastic member 37 serves as a "second elastic mechanism" of the embodiment of the present invention.

A flange portion 17a is formed around an end portion of the housing 17 of the brake pedal 2 side, and is fixed to a not shown stationary member by a fixing member 38 such as a bolt. On the other hand, in order to support the load detecting mechanism 28, a plug 39 is inserted into a bottom space of the load detecting mechanism 28.

As described, in order to prevent a leakage of the brake fluid, the piston seals 26 (26a, 26b) are interposed between the cylinder 18 and the piston 19 and 20. Likewise, a plurality of sealing member 40 are also interposed between the housing 17 and the cylinder 18, and between the pushing element 27 and the housing 17.

Next, here will be explained an action of the brake operating device 1 according to the embodiment of the present invention. In the brake operating device 1 thus structured, when the brake pedal 2 is depressed, a pedal force (load) applied to the brake pedal 2 is detected by the load detecting mechanism 28.

First of all, here will be explained actions of the brake pedal 2, and members arranged coaxially with the brake pedal 2 such as the operation rod 3, the input piston 10, the primary piston 19, the return spring 23a arranged in the inner circumferential side of the primary piston 19, the secondary piston 20, and the return spring 23b arranged in the inner circumferential side of the secondary piston 20. When the brake pedal 2 is depressed, the operation rod 3 connected to the brake pedal 2 is pushed in the axial direction. Consequently, the input piston 10 connected to the operation rod 3, the primary piston 19 connected to the input piston 10, and the secondary piston 20 are also pushed in the axial direction.

As described, the set load of the return spring 23a arranged in the inner circumferential side of the primary piston 19 and the set load of the return spring 23b arranged in the inner circumferential side of the secondary piston 20 are differed from each other. According to the embodiment of the present invention, the set load of the return spring 23b arranged in the inner circumferential side of the secondary piston 20 is smaller than the set load of the return spring 23a arranged in the inner circumferential side of the primary piston 19. Therefore, when the pedal force applied to the brake pedal 2 overwhelms the set load of the return spring 23b arranged in the inner circumferential side of the secondary piston 20, the return spring 23b is compressed. At the same time, the members connected to the operation rod 3 directly or indirectly such as the input piston 10, the primary piston 19, and the secondary piston 20 are also moved (slidably) in the axial direction. Consequently, the ports 25a and 25b pass over the piston seals 26a and 26b respectively in the axial direction.

Then, when the brake pedal 2 is further depressed and the pedal force applied to the brake pedal 2 exceeds the set load of the return spring 23a arranged in the inner circumferential side of the primary piston 19, the return spring 23a is compressed. Specifically, the return spring 23a is compressed by the primary piston 19, and the return spring 23b is compressed by the secondary piston 20. Consequently, a hydraulic pressure of the brake fluid held in the first pressure chamber 16a formed in front of the primary piston 19 is raised, and a hydraulic pressure of the brake fluid held in the second pressure chamber 16b formed in front of the secondary piston 20 is raised. When the pedal force applied to the brake pedal is eliminated, the brake pedal 2 is returned to the initial position by the elastic forces of the return springs 23a and 23b.

Next, here will be explained a load applied to the load detecting mechanism 28. As explained, as a result of pushing the members arranged coaxially with the brake pedal 2, a pushing force is applied to the pushing element 27 in accordance with the pedal force applied to the brake pedal 2. As also described, the elastic force of the elastic member 37 is greater than the set load (or reaction force) of the return spring 23a. Therefore, before the brake pedal 2 is depressed, the clearance C is maintained by the elastic force of the elastic member 37. Specifically, the elastic force of the elastic member 37 is applied to the cylinder 18 in the direction to push the cylinder 18 toward the pushing element 27, and the elastic force (or the set load) of the return spring 23a is also applied to the cylinder 18 in the direction to push the cylinder 18 toward the brake pedal 2. In this situation, since the elastic force of the elastic member 37 is greater than the set load of the return spring 23a, the cylinder 18 is moved toward the pushing element 27 so that the clearance C is maintained.

When the brake pedal 2 is depressed, the return springs 23a and 23b are subjected to a force to be compressed. In this situation, the spring forces of the return springs 23a and 23b before compressed are applied to the pushing element 27 in addition to the elastic force of the elastic member 37, even if the pedal force applied to the brake pedal 2 is still small and the primary piston 19 and the secondary piston 20 have not yet been moved forward. That is, the pedal force applied to the brake pedal 2 is transmitted to the pushing element 27 even before the pedal force applied to the brake pedal 2 overwhelms the set load of the return spring 23b. Consequently, the deforming body 29 is deformed in accordance with the pedal force applied to the brake pedal 2 and hence the pedal force applied to the brake pedal 2 can be detected accurately by the strain gauge 31.

Then, when the brake pedal 2 is further depressed and the pedal force applied to the brake pedal 2 overwhelms the set load of the return spring 23b, the return spring 23b is compressed and the spring force of the return spring 23b is applied to the pushing element 27. In this situation, the primary piston 19 and the secondary piston 20 are moved toward the pushing element 27 so that the ports 25a and 25b pass over the piston seals 26a and 26b respectively to establish the hydraulic pressure. Thereafter, when the brake pedal 2 is further depressed and the pedal force applied to the brake pedal 2 overwhelms the set load of the return spring 23a, the return spring 23a is compressed. Thus, compressions of the return springs 23a and 23b are increased in accordance with an increase in depression of the brake pedal 2, and eventually the load derived from hydraulic pressure is increased. Consequently, the pushing element 27 is pushed toward the load detecting mechanism 28, and the pedal force applied to the brake pedal 2 is detected based on such increase in the pushing force.

That is, the load is applied to the pushing element 27 and the deforming body 29 immediately when the brake pedal 2 is depressed so that the pedal force is applied to the operation rod 3. In the brake operating device 1 according to the embodiment, therefore, the pedal force applied to the brake pedal 2 can be measured in an initial phase of depression of the brake pedal 2 even before the hydraulic pressure is established. In addition, the above-explained disadvantage such as a detection failure of the pedal force due to the reaction force against the brake pedal 2 can be prevented.

Figure 2:
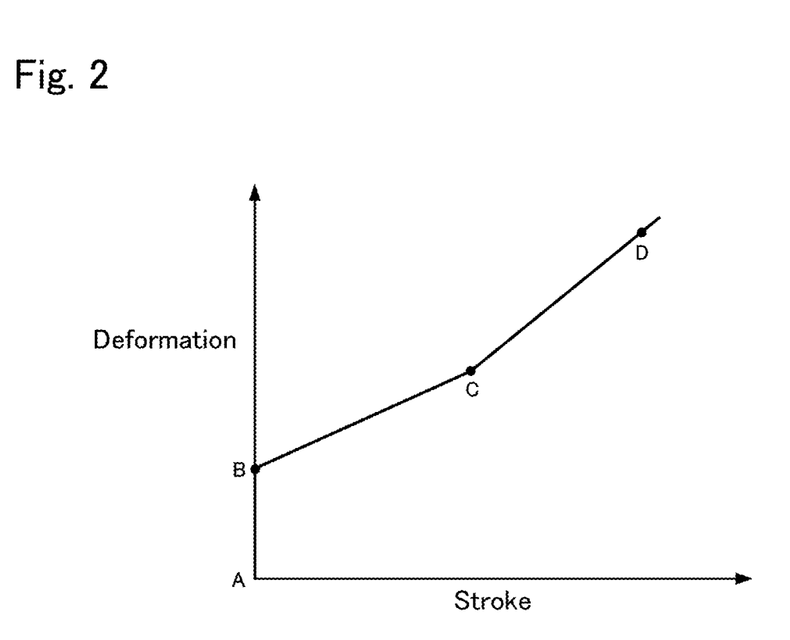
FIG. 2 is a graph indicating a relation between a stroke of the piston and a deformation detected by the detecting mechanism.

FIG. 2 is a graph indicating a relation between an amount of deformation of the deforming body 29 and a stroke amount (as will be simply called the "stroke" hereinafter) of the piston 19 (20), in which the vertical axis represents the deformation and the horizontal axis represents the stroke. As long as the pedal force applied to the brake pedal 2 does not exceed the aforementioned set load, the deformation of the deforming body 29 falls within a range between the point A and the point B. Specifically, before the brake pedal 2 is depressed, the cylinder 18 is pushed by the elastic force of the elastic member 37 toward the pushing element 27 so that the clearance C is maintained. When the pedal force is applied to the brake pedal 2 but the set load of the return spring 23a still overwhelms the pedal force, the brake pedal 2 is not moved forward but the pushing force derived from the spring force of the return spring 23a is applied to the pushing element 27 together with the elastic member 37. In this situation, therefore, the stroke is not increased but the deforming body 29 is deformed by the pushing element 27 so that the pedal force applied to the brake pedal 2 is detected by the load detecting mechanism 28.

When the pedal force applied to the brake pedal 2 is increased so that the brake pedal 2 is further depressed, the return springs 23a and 23b are compressed. Consequently, each of the pistons 19 and 20 is moved forward respectively and the deformation of the deforming body 29 is increased from the point B to the point C.

Thereafter, when the pedal force applied to the brake pedal 2 is further increased, the pistons 19 and 20 are further moved forward so that the brake fluid held in the pressure chambers 16a and 16b is pressurized. Consequently, the deformation of the deforming body 29 is further increased from the point C to the point D. Thus, as indicated in FIG. 2, an inclination of the line representing the deformation of the deforming body 29 becomes steeper with an increase in the stroke.

In the brake operating device 1 according to the embodiment of the present invention, therefore, the pedal force applied to the brake pedal 2 can be measured certainly in every situation. Specifically, the pedal force can be measured before the pedal force overwhelms the set load of the return spring 23b, when the return springs 23a and 23b are compressed before the hydraulic pressure is generated in the pressure chambers 16a and 16b, and after the hydraulic pressure is generated in the pressure chambers 16a and 16b. For this reason, the pedal force applied to the brake pedal 2 and the operating force applied to the brake pedal 2 can be measured more accurately compared to the conventional device for detecting the pedal force based on a change in the hydraulic pressure in the master cylinder.

As described, in the brake operating device 1 according to the embodiment of the present invention, the set load of the return spring 23b arranged in the inner circumferential side of the secondary piston 20 is lower than the set load of the return spring 23a arranged in the inner circumferential side of the primary piston 19. Therefore, the primary piston 19 and the secondary piston 20 are pushed simultaneously in the axial direction. That is, the port 25a of the primary piston 19 and the port 25b of the secondary piston 20 pass over the piston seal 26a and the piston seal 26b simultaneously. For this reason, a relation between a depression of the brake pedal 2 and a change in the hydraulic pressure can be obtained accurately to measure the pedal force applied to the brake pedal 2 accurately.

As also described, in the brake operating device 1 according to the embodiment of the present invention, the cylinder 18 is pushed toward the pushing element 27 by the elastic member 37. Therefore, the load can be detected without worsening an operation feeling of the brake pedal 2. Further, the brake operating device 1 is provided with the stopper portion 36 that restricts the load applied to the load detecting mechanism 28. Therefore, a maximum load applied to the load detecting mechanism 28 can be reduced and a deformation to be detected can be increased. In other words, a damage on the load detecting mechanism 28 can be reduced and hence a range of the deformation to be detected can be widened.

As also described, the pushing element 27 and the load detecting mechanism 28 are arranged in the leading end side the master cylinder 5 arranged coaxially with the brake pedal 2, the pedal force applied to the brake pedal 2 can be detected easily by pushing the cylinder 18 by the elastic member 37. That is, the pedal force applied to the brake pedal 2 can be detected accurately by a simple structure. Therefore, a manufacturing cost of the brake operating device 1 can be reduced compared to the conventional one in which a pedal force sensor is arranged in the brake pedal 2.

Although the above exemplary embodiments of the present invention have been described, the present invention should not be limited to the described exemplary embodiments, and various modifications can be made to achieve the objective of the present invention. In the foregoing embodiment, the elastic member 37 is contacted to the flange section 18c of the cylinder 18. However, the elastic member 37 may also be arranged e.g., at an intermediate section of the cylinder 18 in the axial direction. That is, a position of the elastic member 37 may be changed arbitrarily as long as the cylinder 18 is pushed toward the pushing element 27 to maintain the clearance C.

In the foregoing embodiment, the stopper portion 36 is formed the outer circumference of the deforming body 29. However, a structure of the stopper portion 36 may be modified arbitrarily as long as the travelling distance of the pushing element 27 can be restricted when the load greater than the predetermined value is applied to the pushing element 27. In addition, a single-type master cylinder having only one hydraulic system may also be employed instead of the tandem master cylinder 5. Further, the pushing element 27 may also be formed integrally with the cylinder 18.

REFERENCE SIGNS LIST

1: brake operating device; 2: brake pedal; 3: operation rod; 5: master cylinder; 10: input piston 16a: first hydraulic chamber 16b: second hydraulic chamber; 18: cylinder 19: primary piston 20: secondary piston 23a, 23b: return springs 27: pushing element; 28: load detecting mechanism; 29: deforming body; 30: pressure receiving face; 31: strain gauge 36: stopper portion; 37: elastic member.

The invention claimed is:

1. A brake operating device having a detecting mechanism that transmits a signal in accordance with a pushing force, and a pushing element that pushes the detecting mechanism by the pushing force in accordance with a pedal force applied to a brake pedal, comprising:
a pusher that is connected to the brake pedal;
a hydraulic system in which fluid is held between the pusher and the pushing element to transmit a thrust force of the pusher to the pushing element;
a first elastic mechanism that establishes an elastic force in a direction to isolate the pusher away from the pushing element;
a cylinder that holds the pusher while restricting a withdrawal limit of the pusher in a direction away from the pushing element; and
a second elastic mechanism that is arranged at a position to push the cylinder, and that establishes an elastic force against the elastic force in the direction to isolate the pusher away from the pushing element.

2. The brake operating device as claimed in claim 1, wherein the pusher comprises a piston that pushes the first elastic mechanism in a direction against the elastic force of the first elastic mechanism in accordance with the pedal force applied to the brake pedal.

3. The brake operating device as claimed in claim 2, wherein the piston comprises a first piston that is connected to the brake pedal, and a second piston that is arranged between the first piston and the pushing element while being allowed to move relatively to the first piston, and
the first elastic mechanism comprises a first elastic member that establishes an elastic force to isolate the first piston and the second piston away from each other, and a second elastic member that establishes an elastic force to isolate the second piston from the pushing element.

4. The brake operating device as claimed in claim 3, wherein a spring constant of the second elastic member is smaller than a spring constant of the first elastic member.

5. The brake operating device as claimed in claim 4, further comprising:
a deforming body that is deformed by the pushing force of the pushing element, and
wherein the detecting mechanism comprises a strain gauge that detects a deformation of the deforming body.

6. The brake operating device as claimed in claim 5, wherein the pushing element is adapted to be moved by a pushing force generated by the first elastic mechanism and the hydraulic system to push the deforming body, and further comprising:
a load restricting mechanism that restricts a load applied to the deforming body by restricting a travel distance of the pushing element toward the deforming body.

7. The brake operating device as claimed in claim 3, further comprising:
a deforming body that is deformed by the pushing force of the pushing element, and
wherein the detecting mechanism comprises a strain gauge that detects a deformation of the deforming body.

8. The brake operating device as claimed in claim 7, wherein the pushing element is adapted to be moved by a pushing force generated by the first elastic mechanism and the hydraulic system to push the deforming body, and further comprising:
a load restricting mechanism that restricts a load applied to the deforming body by restricting a travel distance of the pushing element toward the deforming body.

9. The brake operating device as claimed in claim 2, further comprising:
a deforming body that is deformed by the pushing force of the pushing element, and
wherein the detecting mechanism comprises a strain gauge that detects a deformation of the deforming body.

10. The brake operating device as claimed in claim 9, wherein the pushing element is adapted to be moved by a pushing force generated by the first elastic mechanism and the hydraulic system to push the deforming body, and further comprising:
    a load restricting mechanism that restricts a load applied to the deforming body by restricting a travel distance of the pushing element toward the deforming body.

11. The brake operating device as claimed in claim 1, further comprising:
    a deforming body that is deformed by the pushing force of the pushing element, and
    wherein the detecting mechanism comprises a strain gauge that detects a deformation of the deforming body.

12. The brake operating device as claimed in claim 11, wherein the pushing element is adapted to be moved by a pushing force generated by the first elastic mechanism and the hydraulic system to push the deforming body, and further comprising:
    a load restricting mechanism that restricts a load applied to the deforming body by restricting a travel distance of the pushing element toward the deforming body.

\* \* \* \* \*